US008805678B2

(12) United States Patent
Wu

(10) Patent No.: US 8,805,678 B2
(45) Date of Patent: Aug. 12, 2014

(54) METHOD AND SYSTEM FOR ASYNCHRONOUS PIPELINE ARCHITECTURE FOR MULTIPLE INDEPENDENT DUAL/STEREO CHANNEL PCM PROCESSING

(75) Inventor: David Wu, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 2270 days.

(21) Appl. No.: 11/558,145

(22) Filed: Nov. 9, 2006

(65) Prior Publication Data

US 2008/0114477 A1 May 15, 2008

(51) Int. Cl.
*G10L 11/00* (2006.01)
*G06F 15/00* (2006.01)
*G10L 21/00* (2013.01)
*G10L 19/14* (2006.01)
*G10L 19/00* (2013.01)

(52) U.S. Cl.
USPC ........... 704/200; 704/500; 704/501; 704/502; 704/503; 704/504; 704/201; 704/211; 704/212

(58) Field of Classification Search
USPC .......... 704/E19.005, 500–504, 200, 201, 211, 704/212; 348/515; 700/94
See application file for complete search history.

(56) References Cited

U.S. PATENT DOCUMENTS

| | | | | |
|---|---|---|---|---|
| 5,946,352 A * | 8/1999 | Rowlands et al. | ............ | 375/242 |
| 6,029,221 A * | 2/2000 | Wu et al. | ........................ | 710/305 |
| 6,124,895 A * | 9/2000 | Fielder | .......................... | 348/515 |
| 6,128,597 A * | 10/2000 | Kolluru et al. | ................ | 704/500 |
| 6,140,836 A * | 10/2000 | Fujii et al. | ........................ | 326/35 |
| 6,225,827 B1 * | 5/2001 | Fujii et al. | ........................ | 326/98 |
| 6,310,652 B1 * | 10/2001 | Li et al. | .......................... | 348/515 |
| 6,362,755 B1 * | 3/2002 | Tinker | ............................. | 341/61 |
| 6,757,659 B1 * | 6/2004 | Tanaka et al. | ................. | 704/501 |
| 7,010,370 B1 * | 3/2006 | Riegelsberger | ................. | 700/94 |
| 7,262,716 B2 * | 8/2007 | Yu et al. | .......................... | 341/61 |
| 7,406,409 B2 * | 7/2008 | Otsuka et al. | ................. | 704/211 |
| 7,606,627 B2 * | 10/2009 | Wilson et al. | ................... | 700/94 |
| 2002/0049581 A1 * | 4/2002 | Liu | ............................... | 704/200 |
| 2003/0196078 A1 * | 10/2003 | Wise et al. | .................... | 712/300 |
| 2003/0227969 A1 * | 12/2003 | Wise et al. | ................. | 375/240.1 |
| 2006/0173691 A1 * | 8/2006 | Mukaide | ........................ | 704/500 |
| 2006/0241796 A1 * | 10/2006 | Messer et al. | .................... | 700/94 |

OTHER PUBLICATIONS

I. Kuroda and T. Nishitani, "Asynchronous Multirate System Design for Programmable DSPs," ICASSP, vol. 5, San Francisco, CA, IEEE, 1992, p. 549-552.*

* cited by examiner

*Primary Examiner* — Edgar Guerra-Erazo
(74) *Attorney, Agent, or Firm* — Foley & Lardner LLP; Christopher J. McKenna; Brett Belden

(57) ABSTRACT

Aspects of a method and system for an asynchronous pipeline architecture for multiple independent dual/stereo channel PCM processing are provided. Asynchronously pipeline processing of audio information comprised within a decoded PCM frame may be based on metadata information generated from the decoded PCM frame and an output decoding rate. The asynchronously pipeline processing may comprise mixing a primary audio information portion and a secondary audio information, portion, sample rate converting the audio information, and buffering the audio information. The asynchronously pipeline processing may comprise multiple pipeline stages. Feeding back an output of one of the pipeline stages to an input of a previous one of the pipeline stages may be enabled. The metadata information may comprise a frame start indicator associated with the decoded PCM frame and/or a plurality of mixing coefficients.

30 Claims, 6 Drawing Sheets

METHOD AND SYSTEM FOR ASYNCHRONOUS PIPELINE ARCHITECTURE FOR MULTIPLE INDEPENDENT DUAL/STEREO CHANNEL PCM PROCESSING

CROSS-REFERENCE TO RELATED APPLICATIONS/INCORPORATION BY REFERENCE

This patent application makes reference to:
U.S. application Ser. No. 11/558,168 filed on Nov. 9, 2006 even date herewith;
U.S. application Ser. No. 11/558,191 filed on Nov. 9, 2006 even date herewith; and
U.S. application Ser. No. 11/558,229 filed on Nov. 9, 2006 even date herewith.

Each of the above stated applications is hereby incorporated herein by reference in its entirety.

FIELD OF THE INVENTION

Certain embodiments of the invention relate to audio signal processing. More specifically, certain embodiments of the invention relate to a method and system for an asynchronous pipeline architecture for multiple independent dual/stereo channel PCM processing.

BACKGROUND OF THE INVENTION

With the development of optical disk technology, larger amounts of audio and/or video data may be stored in a single disk when compared to other technologies such as magnetic recording, for example. Recent developments continue to expand the capabilities of optical disks by enabling higher data storage capacity within a single disk. For example, Blu-ray optical disk technology may utilize blue lasers to read and write to the disc. A Blu-ray disc may store substantially more data than, for example, a digital versatile disk (DVD) or a compact disk (CD), because of the shorter wavelength, approximately 405 nm, of the blue laser compared to the 650 nm wavelength for red lasers used by DVDs and the 780 nm wavelength for infrared lasers used by CDs. The use of shorter wavelengths enables more information to be stored digitally in the same amount of space. In comparison to high-definition digital versatile disk (HD-DVD), which also uses a blue laser, Blu-ray technology may enable more information capacity per optical disk layer.

For Blue-ray applications, coders/decoders (codecs) may be utilized to compress and/or decompress audio and video information to be stored and/or retrieved from optical discs. For video applications, standalone Blu-ray players may be able to decode various codec formats, such as, MPEG-2, which is also used for DVDs, H.264/AVC, a newer codec developed jointly by ISO/IEC's MPEG and ITU-T's VCEG, and/or VC-1, a codec based on Microsoft's Windows Media 9. For audio applications, Blu-ray players may support Dolby Digital, digital theater system (DTS), and linear pulse code modulation (PCM), up to 7.1 channels, for example. Blu-ray players may also support Dolby Digital Plus and lossless formats such as Dolby TrueHD and DTS HD, for example. In some instances, the Blu-ray player may need to support the linear PCM 5.1, Dolby Digital 5.1 and DTS 5.1 bitstream formats as one of them may be used as the sole soundtrack on a disc. For lossless audio in movies in the PCM, Dolby TrueHD or DTS-HD formats, Blu-ray discs may support encoding of up to 24-bit/192 kHz for up to six channels or up to 24-bit/96 kHz for up to eight channels.

In HD-DVD audio applications, up to 7.1 channels of surround sound may be mastered using the linear (uncompressed) PCM, Dolby Digital, and DTS formats also used on DVDs. Moreover, HD-DVD players may also support Dolby Digital Plus and lossless formats such as Dolby TrueHD and DTS HD, for example. On HD-DVD applications, the Dolby formats such as Dolby Digital or Dolby Digital Plus track, for example, may be used as the sole soundtrack on a disc. For lossless audio in movies in the PCM, Dolby TrueHD or DTS-HD formats, HD-DVD discs may support encoding of up to 24-bit/192 kHz for two channels or of up to 24-bit/96 kHz encoding for eight channels.

Coding and/or decoding systems that provide sufficient architectural flexibility and efficiency to support the requirements of new optical storage technologies, such as Blue-ray and/or HD-DVD, for example, may be necessary for the design and implementation of cost-effective consumer products.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an asynchronous pipeline architecture for multiple independent dual/stereo channel PCM processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an asynchronous pipeline architecture for multiple independent dual/stereo channel pulse code modulation (PCM) processing. Aspects of the invention may comprise asynchronous pipeline processing of audio information within a decoded PCM frame that may be based on metadata information generated from the decoded PCM frame and an output decoding rate. The asynchronous pipeline processing may comprise mixing a primary audio information portion and a secondary audio information, portion, sample rate converting the audio information, and buffering the audio information. The asynchronously pipeline processing may comprise multiple pipeline stages. Feeding back an output of one of the pipeline stages to an input of a previous one of the pipeline stages may be enabled. The metadata information may comprise a frame start indicator associated with the decoded PCM frame and/or a plurality of mixing coefficients.

Aspects of the invention may refer to an asynchronous data path for multiple independent audio channel pairs that comprises multiple pipeline stages. In this regard, each pipeline stage may either bypass or may perform some specific function for each channel pair or for a group of channel pairs, for example, with independent timing. The data flow for each channel pair or group of channel pairs flowing through each pipeline stage may be controlled by the last stage in a pull model, for example. Each pipeline stage may comprise a processing unit and/or multiple FIFO buffers as the pipeline buffer. The FIFO buffers may be small buffers shared within a single RAM. Each channel pair may utilize a single FIFO buffer, for example. The processing unit within a single stage may process the data to fill the FIFO buffer when there is a sample pair of space available in the FIFO buffer and after a request may be granted by, for example, a round-robin arbitration among the multiple FIFO buffers.

Figure 1A:
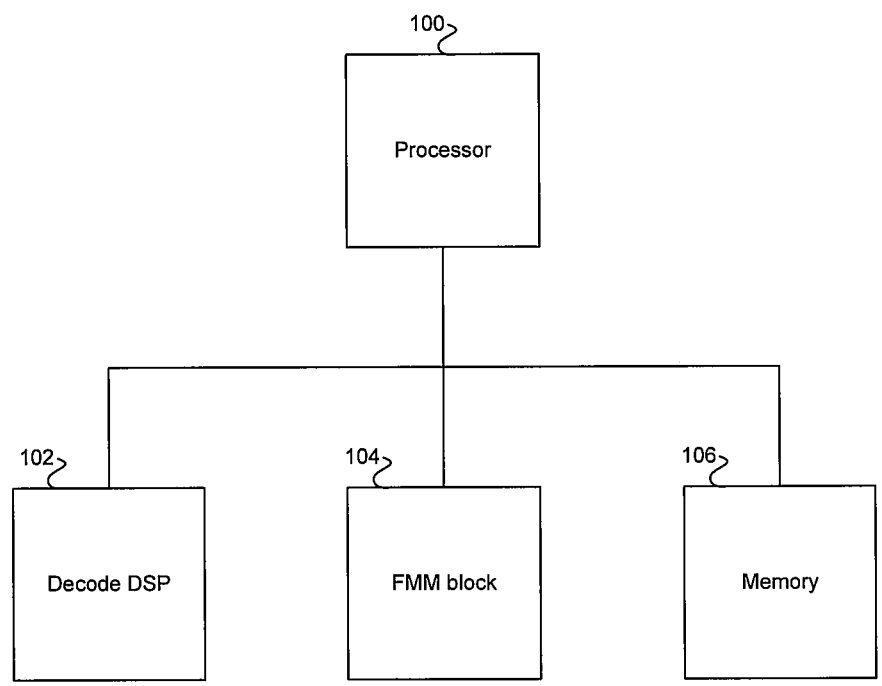
FIG. 1A is a block diagram illustrating an exemplary audio decoding system for Blu-ray and/or high-definition DVD, in accordance with an embodiment of the invention.

FIG. 1A is a block diagram illustrating an exemplary audio decoding system for Blu-ray and/or high-definition DVD, in accordance with an embodiment of the invention. Referring to FIG. 1A, there is shown a system for audio decoding that may comprise a processor 100, a decode digital signal processor (DSP) 102, a flexible audio mixing and muxing (FMM) block 194, and a memory 106. The processor 100 may comprise suitable, logic, circuitry and/or code that may enable control and/or management of operations performed by the decode DSP 102, the FMM block 104, and/or the memory 106. The decode DSP 102 may comprise suitable logic, circuitry, and/or code that may enable decoding of audio information. In this regard, the audio information may be comprised within PCM frames, for example. The output of the decode DSP 102 may be communicated to the FMM block 104. The memory 106 may comprise suitable logic, circuitry, and/or code that may enable storage of data processed by the decode DSP 102 and/or the FMM block 104.

The FMM block 104 may comprise suitable, logic, circuitry and/or code that may enable playback and channel mixing for Blu-ray and/or high-definition DVD (HD-DVD) operations, for example. In this regard, the FMM block 104 may enable playback and channel mixing of up to 7.1 channels primary audio, 5.1 channel secondary audio, and/or 8 channel of mono sound effects at 96 KHz. The FMM block 104 may enable playback and channel mixing stereo primary audio, stereo secondary audio, and/or stereo or two mono sound effects at 192 KHz, for example. The FMM block 104 may also enable 5.1 channels AC-3 or digital theater system (DTS) encoding for compressed Sony/Philips digital interface (SPDIF), where AC-3 refers to the 5.1-channel sound system specified in the digital-HDTV standard and also known as Dolby Digital.

The FMM block 104 may enable various stages of mixing, for example. A first mixing stage may enable mixing of 7.1 channels primary audio, 5.1 channel secondary audio, and 8 mono stereo channels sound effects. Another mixing stage may enable down-mixing the output of the first mixing stage. In this regard, the FMM block 104 may provide dynamic update of mixing coefficients, synchronization at frame boundary, mixing coefficient smoothing or ramping, and soft limiting for channel mixing.

The FMM block 104 may also enable high-quality sample rate conversion (SRC) for sampling conversion of 48/192, 48/96, 192/48, 96/48, 12/192, 12/96, 12/48, 24/192, 24/96, and 24/48 kHz, for example. Linear interpolation SRC for each input may be supported. The FMM block 104 may also support delay balance between compressed SPDIF, digital-to-analog conversion (DAC) and inter-IC sound (I2S) outputs, for example. Moreover, the FMM block 104 may also support other post processing operations, for example.

Figure 1B:
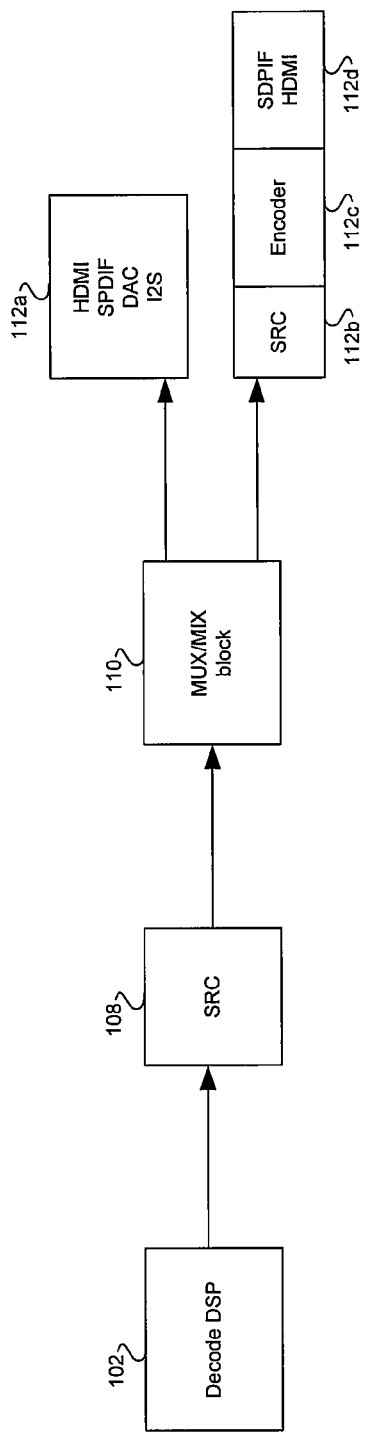
FIG. 1B is a block diagram illustrating an exemplary sequential FMM topology, in accordance with an embodiment of the invention.

FIG. 1B is a block diagram illustrating an exemplary sequential FMM topology, in accordance with an embodiment of the invention. Referring to FIG. 1B, there is shown a sequential architecture or topology for a system that enables playback and channel mixing, wherein the system may comprise an sample rate converter (SRC) 108, a muxing and mixing (MUX./MIX) block 110, an HDMI/SPDIF/DAC/I2S block 112a, an SRC 112b, an encoder 112c, and an SPDIF/HDMI block 112d. The system may also comprise a decode DSP, such as the decode DSP 102 disclosed in FIG. 1A.

The SRC 108 may comprise suitable logic, circuitry, and/or code that may enable sample rate conversion of data provided by the decode DSP 102. The MUX/MIX block 110 may comprise suitable logic, circuitry, and/or code that may enable mixing and/or of multiplexing data provided by the SRC 108. The MUX/MIX block 110 may communicate the processed data to the HDMI/SPDIF/DAC/I2S block 112a and/or to the SRC 112b, for example. The HDMI/SPDIF/DAC/I2S block 112a may comprise suitable logic, circuitry, and/or code that may enable processing of data in at least one of a plurality of formats such as high definition multimedia interface (HDMI), SPDIF, DAC, and/or I2S, for example. The SRC 112b may comprise suitable logic, circuitry, and/or code that may enable sample rate conversion of data provided by the MUX/MIX block 110. The encoder 112c may comprise suitable logic, circuitry, and/or code that may enable encoding of the sample rate converted data from the SRC 112b. The SPDIF/HDMI block 112d may comprise suitable logic, circuitry, and/or code that may enable processing of the encoded data generated by the encoder 112c in at least one of a plurality of formats such as high definition multimedia interface (HDMI) and SPDIF, for example.

Communication from the decode DSP 102 to the SRC 108 and from the SRC 108 to the MUX/MIX block 110 may occur via a plurality of channels such as 22 channels, for example. Communication from the MUX/MIX block 110 to the HDMI/SPDIF/DAC/I2S block 112a may occur via 14 channels and to the SRC 112b may occur via 8 channels, for example.

The sequential topology disclosed in FIG. 1B may utilize a single path with down-mixing, decoding output, and encoding output in a serial pipeline scheme. In some instances, while this topology may be less costly by sharing the mixing output, it may also result in a more complex system and/or software design, such as TSM or host PI configuration, for example, due to delay dependency between decoding outputs and encoding inputs. In other instances, an independent topology, such as the one disclosed in FIG. 1C, may be more costly due to separate mixing functions for both decoding output and encoding input, but it may result in a more efficient system and/or software design due to the independent delay between decoding path and encoding path.

Figure 1C:
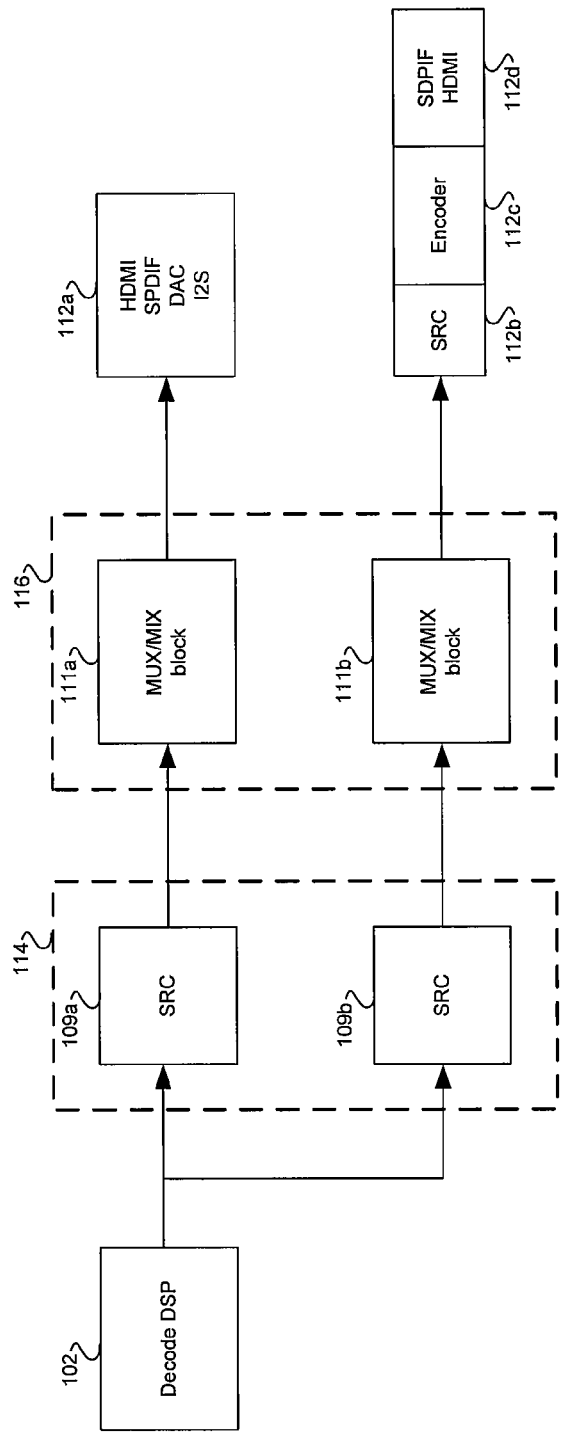
FIG. 1C is a block diagram illustrating an exemplary independent FMM topology, in accordance with an embodiment of the invention.

FIG. 1C is a block diagram illustrating an exemplary independent FMM topology, in accordance with an embodiment of the invention. Referring to FIG. 1C, there is shown an independent architecture or topology for a system that enables playback and channel mixing, wherein the system may comprise an SRC 114 and a MUX/MIX block 116. The system may also comprise the HDMI/SPDIF/DAC/I2S block 112a, the SRC 112b, the encoder 112c, the SPDIF/HDMI block 112d, and the decode DSP 102 disclosed in FIG. 1B. The SRC 114 may comprise a first SRC 109a and a second SRC 109b. The MUX/MIX block 116 may comprise a first MUX/MIX block 111a and a second MUX/MIX block 111b.

The SRCs 109a, 109b may comprise suitable logic, circuitry, and/or code that may enable sample rate conversion of data provided by the decode DSP 102. The MUX/MIX blocks 111a, 11b may comprise suitable logic, circuitry, and/or code that may enable mixing and/or multiplexing data provided by the SRCs 109a, 109b respectively. The MUX/MIX blocks 111a, 11b may communicate the processed data to the HDMI/SPDIF/DAC/I2S block 112a and to the SRC 112b, respectively. Communication from the decode DSP 102 to the SRCs 109a, 109b and from the SRCs 109a, 109b to the MUX/MIX blocks 111a, 11b may occur via a plurality of channels such as 22 channels, for example. Communication from the MUX/MIX block 111a to the HDMI/SPDIF/DAC/I2S block 112a may occur via 14 channels and from the MUX/MIX block 111b to the SRC 112b may occur via 8 channels, for example.

In some instances, post processing functions, may require that the mixed multi-channels be routed back through to memory ring buffers, such as DRAM buffers, and played back again through a flexible audio mixing and muxing (FMM) processing. In this regard, delay balance between the outputs that result from post processing and those without post processing may be necessary. Since the number of playbacks and captures may be less for a sequential topology when post processing is enabled, both sequential and independent topologies may be utilized for a system that enables playback and channel mixing of audio signals such as those for Blu-ray and/or HD-DVD operations. In some instances, the independent topology may be more suitable when dual decoding and encoding are enabled while the independent topology may be more suitable when dual decoding and post processing operations are enabled.

For 48 KHz playback and channel mixing systems, the mixer and multi-channel outputs may operate at the sampling rate of 48 KHz. In this regard, input samples at rates other than 48 KHz may be sample rate converted, mixed and played back at 48 KHz. For 96 KHz playback and channel mixing systems, the mixer and multi-channel outputs may operate at the sampling rate of 96 KHz and input samples at rates other than 96 KHz may be sample rate converted, mixed and played back at 96 KHz. Similarly, for 192 KHz playback and channel mixing systems, the mixer and multi-channel outputs may operate at the sampling rate of 192 KHz and input samples at rates other than 96 KHz may be sample rate converted, mixed and played back at 96 KHz.

Figure 1D:
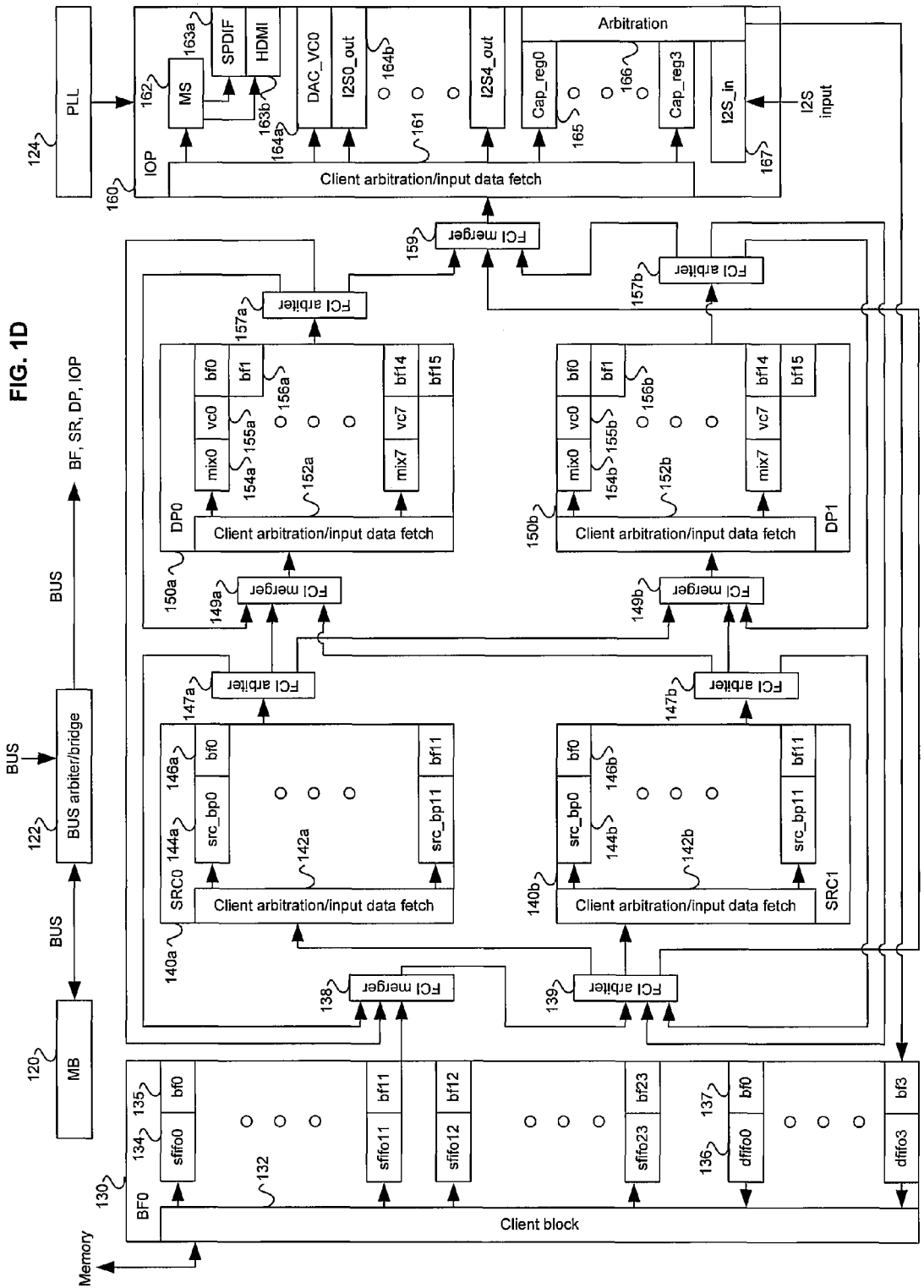
FIG. 1D is a block diagram illustrating an exemplary FMM top-level architecture, in accordance with an embodiment of the invention.

FIG. 1D is a block diagram illustrating an exemplary FMM top-level architecture, in accordance with an embodiment of the invention. Referring to FIG. 1D, there is shown an architectural implementation of the FMM block 104 disclosed in FIG. 1A. The FM block 104 may comprise a metadata block (MB) 120, a BUS artiber/bridge 122, a buffer block (BF0) 130, a first sample rate converter (SRC) block 140a, a second SRC block 140b, a first data path (DP) or PCM mixing block (DP0) 150a, a second data path block (DP1) 150b, an input-output block (IOP) 160, a phase locked loop (PLL) 124, FMM common internal (FCI) interface arbiters 139, 147a, 147b, 157a, and 157b, and FCI interface merger blocks 138, 149a, 149b, and 159.

The exemplary FMM architecture disclosed in FIG. 1B may comprise various types of data flow. One data flow may comprise a decoding data flow from decoding ring buffer to audio playback outputs. Another data flow may comprise an encoding data flow from decoding ring buffer to encoding input ring buffer. The data flows may share the same data pipeline with a data pull model as the flow control. The pipeline stages may include the BF0 130, SRC0 140a, SRC1 140b, DP0 150a, DP1 150b, and IOP 160. The data may be rate controlled and/or pulled from the IOP 160. Each of the stages may comprise a single processing unit and multiple small FIFO buffers as the pipeline buffer, for example. Each channel pair may utilize one FIFO buffer. When space is available within a FIFO buffer, the processing unit may process the data to fill the FIFO buffer after the request is granted by the round-robin arbitration among the multiple FIFO buffers.

The MB 120 may comprise suitable logic, circuitry, and/or code that may enable generation of metadata information that may be communicated to other portions of the FM block 104 for processing the audio data. In this regard, the MB 120 may communicate the metadata information, such as a start of frame indicator and/or mixing coefficients, for example, via the BUS arbiter/bridge 122. The MB 120 may communicate metadata information to the BF0 130, the SRC blocks 140a and 140b, the DP0 150a and DP1 150b, and/or the IOP 160, for example.

The BF0 130 may comprise a client block 132, a plurality of FIFOs 134 and a plurality of buffers 135. The client block 132 may comprise suitable logic, circuitry, and/or code that may enable communication of data between the FMM 104 and memory, such as the memory 106 in FIG. 1A, for example. In this regard, the memory may be a DRAM memory, for example. The FIFOs 134 may comprise suitable logic, circuitry, and/or code that may enable first-in-first-out data storage operations. The FIFOs 134 may be labeled sfifo0 through sfifo23 for source FIFOs and dfifo0 through dfifo3 for destination FIFOs. The buffers 135 may comprise suitable logic, circuitry, and/or code that may enable data storage. The buffers 135 may be labeled bf0 through bf23 for the buffers associated with the FIFOs sfifo0 through sfifo23 and bf0 through bf3 for the buffers associated with the FIFOs dfifo0 through dfifo3.

The client block 132, the FIFOs sfifo0, sfifo12, and dfifo3, and the buffers bf0, bf12, and bf3 associated with dfifo3, may be shared for encoding and decoding path functions, for example. The FIFOs sfifo1 through sfifo11 and the buffers bf1 through bf11 may be utilized for decoding path functions, for example. The FIFOs sfifo13 through sfifo23 and dfifo0 through dfifo2 and the buffers bf13 through bf23 and bf0 through bf2 associated with the FIFOs dfifo0 through dfifo2 may be utilized for encoding path functions, for example.

The SRC0 140a may comprise a client arbitration/input data fetch block 142a, a plurality of sample rate controllers 144a, and a plurality of buffers 146a. The client arbitration/input data fetch block 142a may comprise suitable logic, circuitry, and/or code that may enable communication of data between the SRC0 140a and the FCI arbiter 139. The sample rate controllers 144a may comprise suitable logic, circuitry, and/or code that may enable adjustment of channel rates. The sample rate controllers 144a may be labeled src_bp0 through src_bp11. The buffers 146a may comprise suitable logic, circuitry, and/or code that may enable data storage. The buffers 146a may be labeled bf0 through bf11. The src_bp0 and bf0 may be shared for encoding and decoding path functions while the src_bp1 through src_bp11 and the bf1 through bf11 may be utilized for decoding path functions.

The SRC1 140b may comprise a client arbitration/input data fetch block 142b, a plurality of sample rate controllers 144b, and a plurality of buffers 146b. The client arbitration/input data fetch block 142b may comprise suitable logic, circuitry, and/or code that may enable communication of data between the SRC1 140b and the FCI arbiter 139. The sample rate controllers 144b may comprise suitable logic, circuitry, and/or code that may enable adjusting channel rates. The sample rate controllers 144b may be labeled src_bp0 through src_bp11. The buffers 146b may comprise suitable logic, circuitry, and/or code that may enable data storage. The buffers 146b may be labeled bf0 through bf11. The src_bp0 and bf0 may be shared for encoding and decoding path functions while the src_bp1 through src_bp11 and the bf1 through bf11 may be utilized for encoding path functions.

The DP0 150a may comprise a client arbitration/input data fetch block 152a, a plurality of mixers 154a, a plurality of volume controllers (VCs) 155a, and a plurality of buffers 156a. The client arbitration/input data fetch block 152a may comprise suitable logic, circuitry, and/or code that may enable communication of data between the DP0 150a and the FCI merger 149a. The mixers 154a may comprise suitable logic, circuitry, and/or code that may enable various audio mixing operations. The mixers 154a may be labeled mix0 through mix7. The volume controllers 155a may comprise suitable logic, circuitry, and/or code that may enable volume control during mixing operations. The volume controllers 155a may be labeled vc0 through vc7. The buffers 156a may comprise suitable logic, circuitry, and/or code that may enable data storage. The buffers 156a may be labeled bf0 through bf15. In this regard, two buffers 156a may be associated with an audio channel, for example. The mix0, vc0, and bf0 may be shared for encoding and decoding path functions while the mix1 through mix7, vc1 through vc7, and the bf2 through bf15 may be utilized for decoding path functions.

The DP1 150b may comprise a client arbitration/input data fetch block 152b, a plurality of mixers 154b, a plurality of volume controllers (VCs) 155b, and a plurality of buffers 156b. The client arbitration/input data fetch block 152b may comprise suitable logic, circuitry, and/or code that may enable communication of data between the DP1 150b and the FCI merger 149b. The mixers 154b may comprise suitable logic, circuitry, and/or code that may enable audio mixing operations. The mixers 154b may be labeled mix0 through mix7. The volume controllers 155b may comprise suitable logic, circuitry, and/or code that may enable volume control during mixing operations. The volume controllers 155b may be labeled vc0 through vc7. The buffers 156a may comprise suitable logic, circuitry, and/or code that may enable data storage. The buffers 156b may be labeled bf0 through bf15. In this regard, two buffers 156b may be associated with an audio channel, for example. The mix0, vc0, and bf0 may be shared for encoding and decoding path functions while the mix1 through mix7, vc1 through vc7, and the bf2 through bf15 may be utilized for encoding path functions.

The DP0 150a and the DP1 150b may be utilized to provide operations such as 16 to 1 channel mixing with an 8-channel pair mixer, dual ping-pong coefficient banks, coefficient smoothing, and/or soft limiting in audio mixer. A feed-back loop from the data path (DP) output to the input may allow 7.1 channel PCM from the output of the mixing of primary, secondary and sound effects to be down-mixed further to 5.1 channels for encoding or stereo output, for example.

The IOP 160 may comprise a client arbitration/input data fetch block 161, an MS block 162, an SPDIF block 163a, an HDMI block 163b, a DAC_VC0 block 164a, a plurality of I2S output blocks 164b, a plurality of capture registers 165, an arbitration block 166, and an I2S input block (I2S_in) 167. The plurality of I2S output blocks 164b may be labeled I2S0_out through I2S4_out, for example. The plurality of capture registers 165 may be labeled cap_reg0 through cap_reg3, for example. The client arbitration/input data fetch block 161 may comprise suitable logic, circuitry, and/or code that may enable communication of data between the IOP 160 and the FCI merger 159. The MS block 162 may comprise suitable logic, circuitry, and/or code that may enable data communication between the client arbitration/input data fetch block 161 and the SPDIF block 163a and/or the HDMI block 163b. The SPDIF block 163a may comprise suitable logic, circuitry, and/or code that may enable processing of audio information in accordance with the Sony/Philips digital interface (SPDIF). The HDMI block 163 may comprise suitable logic, circuitry, and/or code that may enable processing audio information in accordance with the high definition multimedia interface (HDMI).

The DAC_VC0 block 164a may comprise suitable logic, circuitry, and/or code that may enable adjusting the volume of the audio signal by performing a digital-to-analog conversion of the audio signal. The plurality of I2S output blocks 164b may comprise suitable logic, circuitry, and/or code that may enable processing audio information in accordance with the I2S interface. The plurality of capture registers 165 may comprise suitable logic, circuitry, and/or code that may enable storage of captured audio information. The arbitration block 166 may comprise suitable logic, circuitry, and/or code that may enable selecting between the plurality of capture registers 165 for providing feedback to the BF0 130 via the destination FIFOs dfifo0 through dfifo3, for example. The I2S_in 167 may comprise suitable logic, circuitry, and/or code that may enable receiving data in accordance with the I2S interface.

The MS 162, the SPDIF block 163a, the HDMI block 163b, the arbitration block 166, and the I2S_in 167 may be shared for encoding and decoding path functions. The DAC_VC0 164a and the plurality of I2S output blocks 164b may be utilized for decoding path functions. The plurality of capture registers 165 may be utilized for encoding path functions.

The IOP 160 may receive at least one clock or reference signal from the PLL 124. In this regard, the PLL 124 may comprise suitable logic, circuitry, and/or code that enables generation of clock or reference signals for supporting a plurality of data rates, for example. The FCI arbiters 139, 147a, 147b, 157a, and 157b may comprise suitable logic, circuitry and/or code that may enable selection from at least one output signal that may result from an FM 104 stage for communication to another stage in the FM 104. The FCI arbiters may utilize a state-machine that enables a two-level of priority round robin approach, for example. The FCI mergers 138, 149a, 149b, and 159 may comprise suitable logic, circuitry, and/or code that may enable merging at least one output signal that may result from an FMM 104 stage for communication to another stage in the FMM 104.

In the exemplary embodiment of the invention disclosed in FIG. 1D, the FMM 104 may enable 24 playbacks via 48 channels, 24 FIFOs, and/or 48 ring buffers, of two channels for each playback. The FMM 104 may also enable 4 captures via 8 channels, 4 FIFOs and/or 8 ring buffers, of two channels per capture. The FMM 104 may also enable 8 outputs, that is, 16 channels, of stereo or multi-channel outputs. The outputs may comprise an SPDIF output for PCM or compressed audio, a DAC output for down-mixed stereo audio, at least two I2S outputs for 7.1 channels and for down-mixed stereo, and/or an HDMI output that may be shared with other output formats. The FMM 104 may also enable an I2S input that may be implemented within the IOP 160 instead of the BF0 130, for example, to enable the IOP 160 to handle the I2S input and I2S output clocks based on the PLL 124 since the BF0 130 may operate based on a system clock.

The FMM 104 disclosed in FIG. 1D may enable a multi-channel program that allows a channel group to be processed in the BF0 130, SRC0 140*a*, SRC1 140*b*, DP0 150*a*, DP1 150*b*, and/or the IOP 160. In this regard, each channel pair within a channel group may share a group identifier (ID). The channels in a group may be in a consecutive channel ID sequence. The group ID number may be the first channel pair ID or pipeline FIFO, for example. Arbiters associated with the pipeline buffer may treats the channel group as a single client, that is, a first client request to the arbiter may be handled when the remaining clients in the group also make a request. Once the request is granted, each channel pair may be processed in the same sequence as the channel pair ID sequence in a group. This approach may ensure channel synchronization across the FMM data path and may also simplify the mixing coefficient alignment.

The FMM 104 disclosed in FIG. 1D may also support the use of metadata information. The metadata may be part of secondary audio syntax that carries the dynamic mixing coefficients between the primary and secondary and the dynamic coefficients updating in mixing functions that may be required to align with the secondary audio frame boundary. The metadata message and frame information may be passed from the decode DSP 102 to the FMM 104 and then utilized to control mixing operations in the DP0 150*a* and/or the DP1 150*b* in order to relax timing requirements to achieve the alignment. In this regard, the FMM 104 may support metadata buffers, pre-formatted message, message unpackers, PCM tagging, and/or dual ping-pong coefficient banks in DP0 150*a* and/or the DP1 150*b* and the MI as control interface, for example.

The FMM 104 disclosed in FIG. 1D may enable a sample rate conversion pipeline block separate from the data path blocks to allow multiple sample rate conversion operations. In this regard, the sample rate conversion functions supported may comprise high quality SRC, that is, SRC with better than −120 dB noise suppression, for example, with ratios of 4 to 1, 1 to 4, 2 to 1, and/or 1 to 2. The sample rate conversion functions may also comprise loop back path to support serial SRC operations and/or linear interpolation of the ratio between 0 and 2, for example.

The FMM 104 may utilize a common internal interface (FCI) in various components to enable the components to be added or removed based on feature requirements without producing interface compatibility issues among the various FMM 104 components. The FCI may utilize a 24-bit data bus, for example, and a plurality of signals. The plurality of signals supported by the FCI may comprise a request (REQ) signal, an acknowledge (ACK) signal, a no acknowledge (NOACK) signal, an identification (ID) signal, a data (DATA) signal, a tag (TAG) signal, channel indicator (CH_LEFT0_RIGHT1) signal, for example.

The REQ signal may be an input signal that may be utilized for requesting a pair of left and right samples. In an exemplary embodiment of the invention, the REQ signal may be high on rising edge of system clock when there is a data request, and low when a second ACK signal is high or when a NOACK signal is high. Generally, the REQ signal may be responded with, for example, two consecutive ACK signal, the first may be a left channel sample and tag and the second may be a right channel sample and tag. When an output client of an FCI is not enabled, a NOACK signal may be outputted and a REQ signal may be de-activated. The ACK signal may be an output signal that may be utilized for acknowledging a requesting block. Each request may be responded with two ACK signals, for example. Each ACK signal may be one clock wide. The NOACK signal may be an output signal that may be utilized to indicate no acknowledgement when the current client is not enabled or when the request client ID is invalid, for example. A NOACK signal may terminate the request to a disabled block and prevents the state machine from hanging or from a dead lock.

The ID signal may be an input signal that may comprise a plurality of bits and that may correspond to identification of an output channel pair in a pipeline block. For example, the ID signal may be utilized to identify clients inside a block within the FMM 104 and/or to identify blocks within the FMM 104. The DATA signal may be an output signal that may comprise a plurality of bits, which may correspond to left or right channel samples. A portion of the DATA signal may be utilized for playback data, while another portion may be utilized for capture data since capture data may be PCM or compressed, where the compressed data may be 16 bits or 32 bits. The data in the DATA signal may be left channel sample when the CH_LEFT0_RIGHT1 signal is low and right channel sample when the CH_LEFT0_RIGHT1 signal is high. The DATA signal may be valid when the ACK signal is high on the rising edge of system clock, for example.

The TAG signal may be an output signal that may comprise a plurality of bits and that may correspond to left or right channel sample tags. The TAG signal may be a left channel sample tag when the CH_LEFT0_RIGHT1 signal is low and a right channel sample tag when the CH_LEFT0_RIGHT1 signal is high. The TAG signal may be valid when the ACK signal is high on the rising edge of system clock, for example. The CH_LEFT0_RIGHT1 signal may be an output signal that may be utilized to indicate left channel samples when it is low and right channel when it is high. The CH_LEFT0_RIGHT1 signal may be valid when the ACK signal is high on the rising edge of system clock, for example.

For some applications, such as for some Blu-ray specifications, metadata may be specified in the secondary audio which carries the dynamic coefficients for audio mixing between the primary and the secondary audio program. In this regard, the coefficients may require alignment with the secondary audio frame boundary during the mixing operation. Moreover, the coefficients in the metadata may be dynamically updated as often as every frame, for example.

Since the mixing operation between the primary and the secondary decoded PCM may be performed by the FMM 104 and there may not be frame information available either in decoded PCM or in existing mixing hardware, some data paths from the decode DSP 102 to the mixing hardware in the FMM 104 may be needed to carry both frame information and coefficients, for example. Moreover, since the coefficients utilized in the mixing operation may need to be updated in correct frame boundary at the appropriate time during mixing, a synchronization interface may be needed between FMM 104 mixing hardware and the decode DSP 102.

Figure 1E:
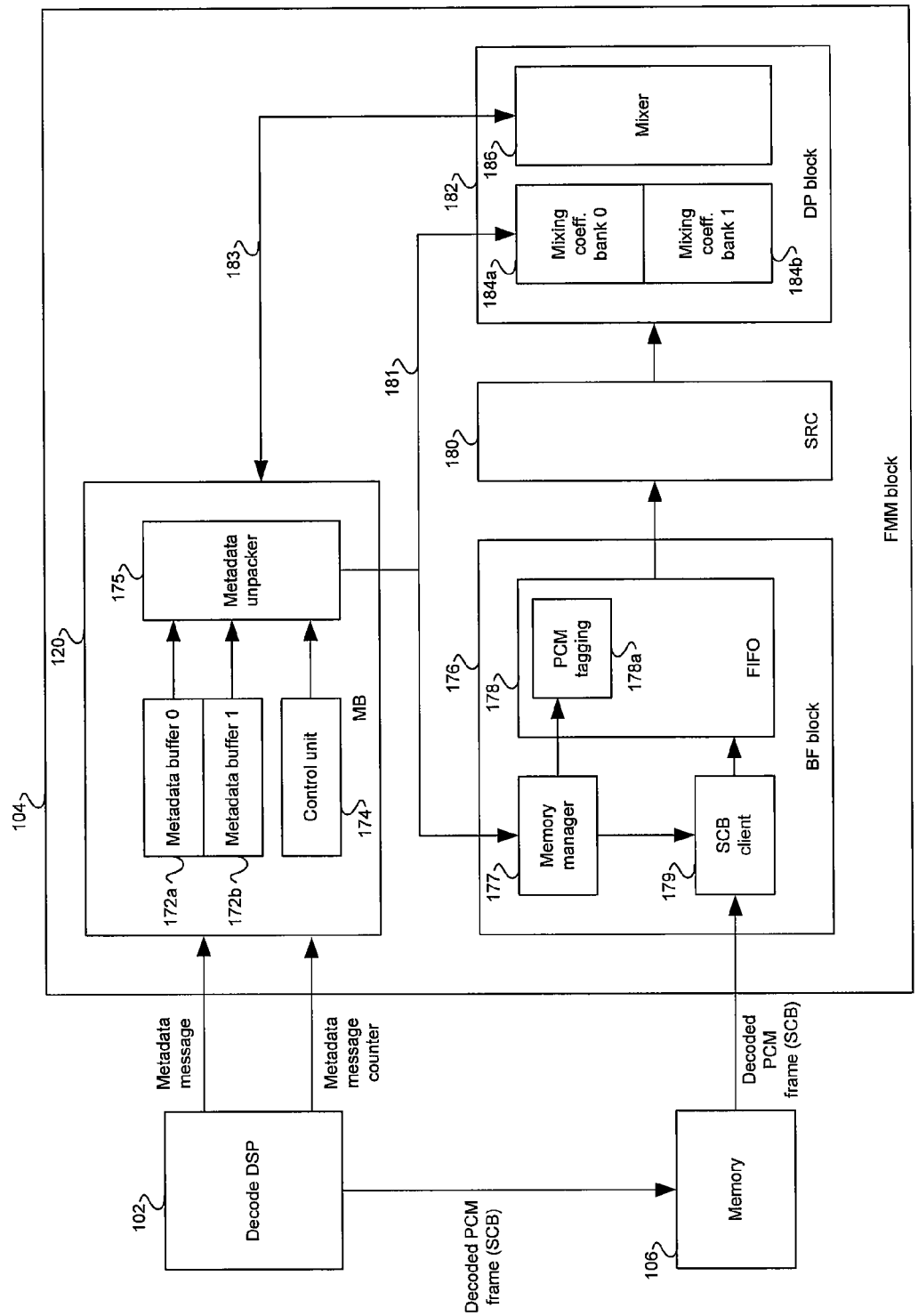
FIG. 1E is a block diagram illustrating exemplary metadata flow and operation between the decode DSP and the FMM block, in accordance with an embodiment of the invention.

FIG. 1E is a block diagram illustrating exemplary metadata flow and operation between the decode DSP and the FMM block, in accordance with an embodiment of the invention. Referring to FIG. 1E, there is shown the FMM 104, the decode DSP 102, and the memory 106 disclosed in FIG. 1A. The FMM 104 may comprise an MB block 120, a BF block 176, an SRC block 180, and a DP block 182. The MB block 120 may comprise a first metadata buffer (metadata buffer 0) 172a, a second metadata buffer (metadata buffer 1) 172b, a control unit 174, and a metadata unpacker 175. The BF block 176 may comprise a memory manager 177, an decoded PCM frame (SCB) client 179, and a FIFO 178. The FIFO 178 may comprise a PCM tagging block 178a. The DP block 182 may comprise a first mixing coefficients bank (mixing coeff. bank 0) 184a, a second mixing coefficients bank (mixing coeff. bank 1) 184b, and a mixer 186. At least a portion of the components disclosed in FIG. 1E may correspond to the FMM 104 components disclosed in FIG. 1D.

The decode DSP 102 may generate metadata messages that may be communicated to the MB block 120 and/or decoded PCM frames that may be communicated to the BF block 176 via the memory 106, for example. The metadata buffers 172a and 172b may comprise suitable logic, circuitry, and/or code that may enable storage of metadata messages from the decode DSP 102 via a bus. The control unit 174 may comprise suitable logic, circuitry, and/or code that may enable processing of a metadata message counter from the decode DSP 102 via a bus. The metadata unpacker 175 may comprise suitable logic, circuitry, and/or code that may enable generation of mixing coefficient information and/or a start of frame indicator from the information generated and/or stored in the metadata buffers 172a and 172b and the control unit 174. There may be more than one metadata unpacker 175 to enable more than one data stream or path, for example. The metadata unpacker 175 may communicate, via the signal 181, for example, a frame start indication to the BF block 176 and the mixing coefficient information to the DP block 182. The MB block 120 may also enable selection of the mixing coefficients bank 184a or the mixing coefficients bank 184b via the signal 183, for example.

The memory manager 177 may comprise suitable logic, circuitry, and/or code that may enable management of memory addresses. In this regard, the memory manager 177 may utilize the frame start indicator provided by the metadata unpacker 175. The SCB client 179 may comprise suitable logic, circuitry, and/or code that may enable receiving decoded PCM frame information from the memory 106. The SCB client 179 may also receive information from the memory manager 177 for processing the received decoded PCM frame. The FIFO 178 may comprise suitable logic, circuitry, and/or code that may enable first-in first-out storage of processed decoded PCM frame information. The PCM tagging 178 may comprise suitable logic, circuitry, and/or code that may enable tagging the start of a processed decoded PCM frame in the FIFO 178. In this regard, the PCM tagging 178a may utilize at least one signal indicating start of frame information provided by the memory manager 177, for example.

The SRC block 180 may comprise suitable logic, circuitry, and/or code that may enable sample rate conversion of the processed decoded PCM frame from the BF block 176. The mixing coefficient banks 184a and 184b may comprise suitable logic, circuitry, and/or code that may enable storage of mixing coefficients communicated from the MB block 120 via the signal 181. The mixer 186 may comprise suitable logic, circuitry, and/or code that may enable selection of a set of mixing coefficients from the mixing coefficient banks 184a and 184b for mixing the sample rate converted PCM frame from the SRC block 180.

In operation, the metadata and the frame information may be passed and stored into buffers in the MB block 120 when the secondary audio program is decoded in the decode DSP 102. Moreover, both coefficients and frame information may be communicated to the BF block 176 and the DP block 182 configuration registers at the appropriate time to achieve the alignment of mixing coefficient with frame boundary. A relaxed timing control may be achieved simply by a message counter as an interface between the metadata unpacker 175 and the decode DSP 102, a message index between the metadata unpacker 175 and the DP block 182 with ping-pong coefficient banks 184a and 184b.

In this regard, the metadata buffers 172a and 172b may store preformatted messages from the decode DSP 102 written through a bus when a secondary audio frame is decoded. Since there are two data flows of decode and encode path in the FMM 104, two metadata buffers may be implemented to allow two streams of metadata messages to be passed from the decode DSP 102 to the FMM 104 in parallel. The metadata unpacker 175 may enable processing and passing of the message to various FMM 104 configuration registers in non-restrictive timing. There may be an 8-bit message counter in the metadata block 120, for example. When a new message is stored in a metadata buffer by the decode DSP 102, the counter may be incremented by the decode DSP 102. The counter may be decremented when a message is processed and sent to the BF block 176 and/or to the DP block 182 by the metadata unpacker 175. The metadata unpacker 175 may start to process a message when the message counter is larger than 0 and an input control signal from the DP block 182 meets a predetermined set of conditions. In some instances, two metadata unpackers 175 may be implemented for two streams of metadata messages, for example.

The coefficients in one mixing coefficient bank in the DP block 182 may be updated from the metadata block 120 while the other bank coefficients is being read for mixing operations.

A metadata message may comprise a frame start address (frame_start_address) signal of decoded PCM frame in ring buffer, a metadata index (MI), a valid bit, and/or mixing coefficients for both primary and secondary audio, for example. The metadata index may comprise multiple bits, for example. The metadata unpacker 175 may communicate the frame_start_address, the MI, and the valid bit to BF block 176 and the mixing coefficients to the DP block 182 via the signal 181, for example.

An 8-bit tag per PCM sample may be associated with each 24-bit PCM to carry the side information from the BF block 176, the SRC block 180, the DP block 182, and/or an input-output block (IOP), such as the IOP 160 in FIG. 1D, to enable these blocks to utilize the side information when each PCM is received and processed. The side information may comprise a PCM valid bit, a PCM inserted bit, and the metadata index. The 4-bit MI may be directly copied from a metadata message and may be incremented by the decode DSP 102 to follow the message sequence. When a new frame_start_address and a newly incremented MI are loaded into the BF block 176 configuration registers, the valid bit may be set to 1 in the message by the decode DSP 102. The frame_start_address may be utilized by the BF block 102 to identify the first PCM sample in the received frame and the newly incremented MI may be placed in the 8-bit PCM tag for the PCM samples of the frame. The MI in the PCM tag may be received later by the DP block 182 for mixing between the primary and the secondary audio. In some instances, the least significant bit of the MI may be utilized by the DP block 182 to select one of the two mixing coefficient banks for the mixing operations.

The MI in the PCM tag received by the DP block 182 may also be outputted back to the metadata unpacker 175. The MI in the PCM tag may be utilized by the metadata unpacker 175 along with the message counter as a control interface to determine when the next metadata message may need processing and may need to be sent to the BF block 176 and/or the DP block 182. The MI may indicate to the metadata unpacker 175 the last message received by the BF block 176 and the DP block 182 and which mixing coefficient bank the DP block 182 may be accessing. When the message counter is larger than zero, for example, and the MI in next message in the metadata buffer is the index from the DP block 182 plus 1, then the next message in the buffer may be processed and communicated. There may be two MI interfaces between the DP block 182 and each of the metadata unpackers 175 to allow two metadata message streams.

Figure 1F:
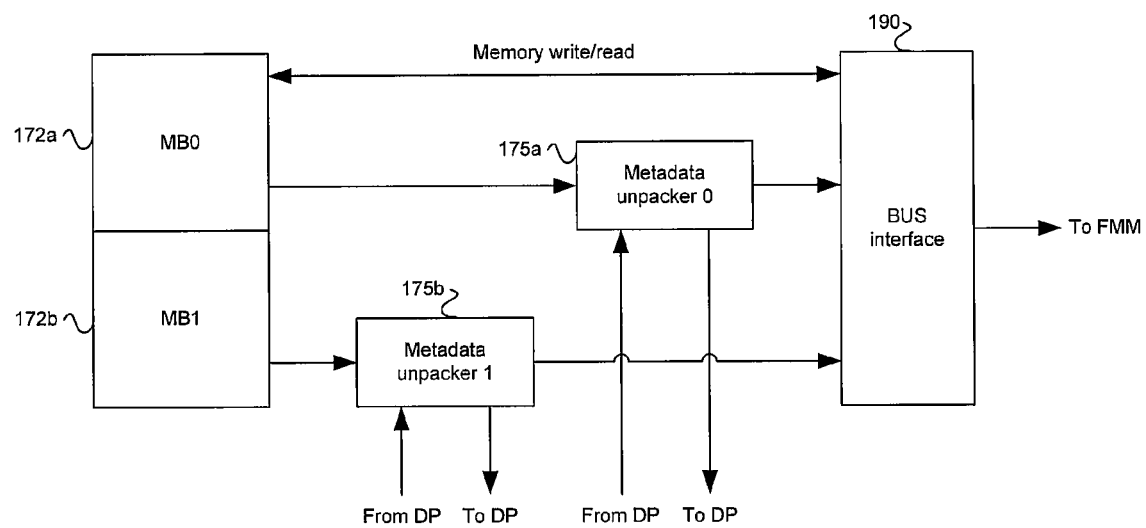
FIG. 1F is a block diagram illustrating an exemplary metadata block architecture, in accordance with an embodiment of the invention.

FIG. 1F is a block diagram illustrating an exemplary metadata block architecture, in accordance with an embodiment of the invention. Referring to FIG. 1F, there is shown a portion of the metadata block 120 that may comprise the first metadata buffer (metadata buffer 0) 172a, the second metadata buffer (metadata buffer 1) 172b, a first metadata unpacker (metadata unpacker 0) 175a, a second metadata unpacker (metadata unpacker 1) 175b, and a BUS interface 190. The metadata unpackers 175a and 175b may be similar or substantially the same as the metadata unpacker 175 disclosed in FIG. 1E. The BUS interface 190 may comprise suitable logic, circuitry, and/or code that may enable communication between the MB block 120 and at least one component of the FMM block 104, for example. In this regard, the BUS interface 190 may communicate with the BF block 176, the SRC block 180, and/or the DP block 182.

One of the metadata buffers 172a and 172b may be utilized for audio mixing in playback path and the other metadata buffer for encode path, however, a metadata buffer need not be limited to just playback path or encode path operations. In one instance, when both encode and decode paths are enabled, the decode DSP 102 may store the same message to both metadata buffers and may control both message counters. The decode DSP 102 may store one message to one of the metadata buffers 172a and 172b and may control two message counters and two address sets in one of the buffer. In another instance, the two independent message streams may flow through the two metadata buffers 172a and 172b and the two metadata unpackers 175a and 175b in the MB block 120, and the two flows may be utilized to control two independent groups of mixers. The metadata buffers 172a and 172b may be implemented in a single port RAM, for example. Each entry in a metadata buffer may be addressed in the RBUS address range.

There may be one or more hardware configuration registers in each of the metadata unpackers 175a and 175b. The MB block 120 may be configured to perform a plurality of operations. For example, when an MB enable signal is zero, the corresponding metadata unpacker may be reset, and an appropriate metadata message counter signal and other internal states may also be reset to zero. In another instance, either a host processor, such as the processor 100, or the decode DSP 102 may configure the MB block 120 address registers. In this regard, the appropriate metadata unpacker may be enabled based on a mixer select signal that indicates the last mixer in the DP block 182 to utilize the metadata unpacker.

When the decode DSP 102 receives and decodes new metadata from the secondary audio program and generates a new metadata message, the decode DSP 102 may write a new metadata message into a metadata buffer in the MB block 120. The decode DSP 102 may also update the metadata buffer write address and may increment a metadata message counter. The message counter may be decremented after one block of metadata is processed by the metadata unpackers 175a and/or 175b.

When the metadata unpackers 175a and/or 175b are enabled, the metadata unpackers may detect that there are new metadata messages in the metadata buffer when the metadata message counter is non-zero. The metadata unpackers 175a and/or 175b may decode the metadata MI and the block length in the message header. In this regard, when the message is the first message since a reset, the metadata unpackers 175a and/or 175b may process the metadata message as soon as possible. When it is not the first message since a reset, the metadata unpackers 175a and/or 175b may compare the MI in the new message in the buffer with the MI from the mixer. When the MI in the metadata buffer is equal to the MI in the mixer plus 1, the metadata unpacker may write each register content in the message to the bus address to both the FB block 176 and the DP block 182. After the entries in the message are processed, the metadata unpacker may decrement the metadata message counter in the configuration register.

When the MI in the metadata buffer is equal to the MI in the mixer plus 2, the metadata unpacker may wait until the MI in the mixer increments to process the message as soon as possible. This may indicate that the previous message has not been used by the BF block 176 and the DP block 182 yet, and the next message will be waited until MI in the metadata buffer is equal to the MI in the mixer plus 1. When the MI in the metadata buffer is equal to the MI in the mixer or is larger than the MI in the mixer plus 2, the next message is not in the right sequence and an error signal may be generated by the metadata unpacker. In this regard, the metadata unpacker may wait until the decode DSP 102 may generate a reset signal.

Since the metadata buffer may be implemented utilizing in a single port RAM, for example, external RBUS write or read from the decode DSP 102 or the host processor may have a higher priority than an internal read. The messages may be updated up to once per frame, for example. The message processing rate may be limited by the time it takes a pair of samples to go from the ring buffer to the mixer output. If the message input rate is higher than may be processed by the FMM block 104, a metadata buffer overflow condition may occur.

Figure 2:
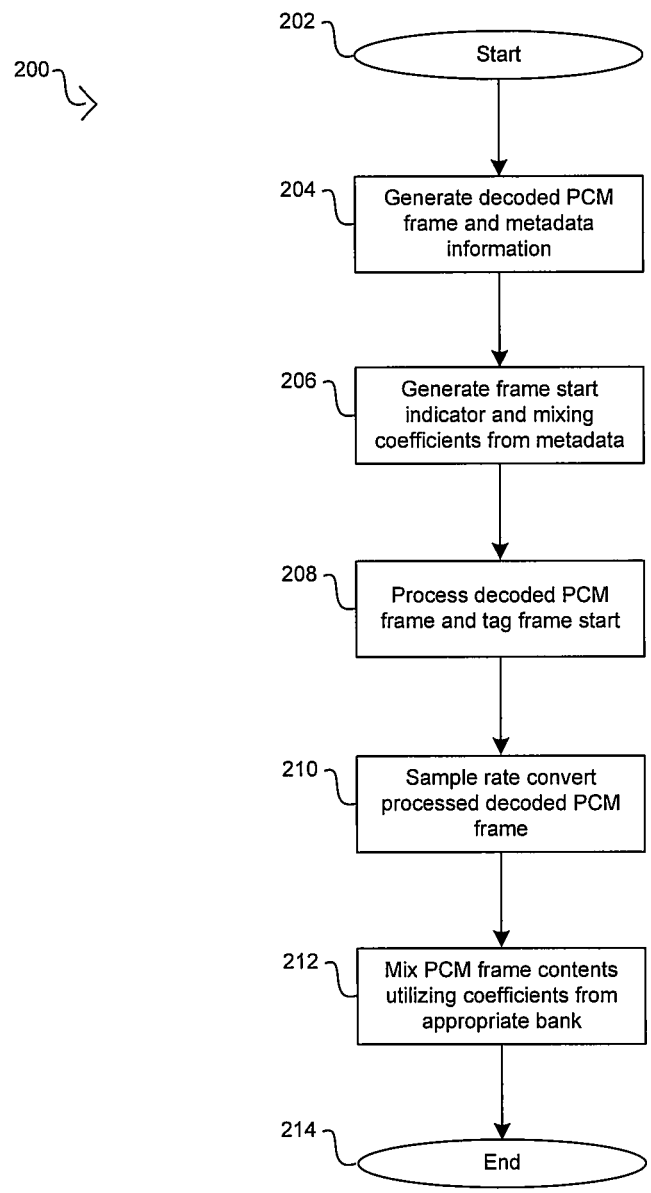
FIG. 2 is a flow diagram illustrating exemplary steps in the operation of the FMM architecture, in accordance with an embodiment of the invention.

FIG. 2 is a flow diagram illustrating exemplary steps in the operation of the FMM architecture, in accordance with an embodiment of the invention. Referring to FIG. 2, there is shown a flow diagram 200. In step 204, after start step 202, the decode DSP 102 may generate the decoded PCM frame and the metadata message and metadata message counter. The decoded PCM frame may be communicated to the FB block 176 in the FMM block 104 via the memory 106. The metadata message and message counter may be communicated to the MB block 120. In step 206, the MB block 120 may process the metadata information received from the decode DSP 102 and may generate a frame start indicator and mixing coefficients that may be communicated to the FB block 176 and the DP block 182 respectively. In step 208, the FB block 176 may process the decoded PCM frame and may tag information associated with the PCM frame start to the processed decoded PCM frame. In step 210, the SRC block 180, may sample rate convert the output of the FB block 176. In step 212, the DP block 182 may select the appropriate mixing coefficients from one of the integrated mixing coefficient banks to perform mixing operations on the sample rate converted PCM frame generated by the SRC block 180. After step 212, the process may proceed to end step 214.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing audio signals, the method comprising:
    performing by one or more processors and/or circuits integrated within a single chip:
        processing metadata information generated from a decoded pulse code modulation (PCM) frame, wherein said decoded PCM frame comprises audio information; and
    asynchronously pipeline processing said audio information in said decoded PCM frame based on said processed metadata information and an output decoding rate, wherein input of data into each stage of said asynchronously pipeline processing is dynamically controlled by said output decoding rate.

2. The method according to claim 1, comprising mixing a primary audio information portion and a secondary audio information portion in said decoded PCM frame during said asynchronously pipeline processing.

3. The method according to claim 1, comprising sample rate converting said audio information in said decoded PCM frame during said asynchronously pipeline processing.

4. The method according to claim 1, comprising buffering said audio information in said decoded PCM frame during said asynchronously pipeline processing.

5. The method according to claim 1, wherein said asynchronously pipeline processing comprises multiple pipeline stages.

6. The method according to claim 5, comprising pulling said audio information through each of said multiple pipeline stages based on said output decoding rate.

7. The method according to claim 5, comprising enabling feeding back an output of one of said multiple pipeline stages to an input of a previous one of said multiple pipeline stages.

8. The method according to claim 1, wherein said processed metadata information comprises a frame start indicator associated with said decoded PCM frame.

9. The method according to claim 8, comprising tagging at least a portion of said decoded PCM frame with said frame start indicator.

10. The method according to claim 1, wherein said processed metadata information comprises a plurality of mixing coefficients.

11. A machine-readable storage having stored thereon, a computer program having at least one code section for processing audio signals, the at least one code section being executable by a machine for causing the machine to perform steps comprising:
    processing metadata information generated from a decoded pulse code modulation (PCM) frame, wherein said decoded PCM frame comprises audio information; and
    asynchronously pipeline processing said audio information comprised within said decoded PCM frame based on said processed metadata information and an output decoding rate, wherein input of data into each stage of said asynchronously pipeline processing is dynamically controlled by said output decoding rate.

12. The machine-readable storage according to claim 11, wherein said at least one code section comprises code for mixing a primary audio information portion and a secondary audio information portion in said decoded PCM frame during said asynchronously pipeline processing.

13. The machine-readable storage according to claim 11, wherein said at least one code section comprises code for sample rate converting said audio information in said decoded PCM frame during said asynchronously pipeline processing.

14. The machine-readable storage according to claim 11, wherein said at least one code section comprises code for buffering said audio information in said decoded PCM frame during said asynchronously pipeline processing.

15. The machine-readable storage according to claim 11, wherein said asynchronously pipeline processing machine-readable storage multiple pipeline stages.

16. The machine-readable storage according to claim 15, wherein said at least one code section comprises code for pulling said audio information through each of said multiple pipeline stages based on said output decoding rate.

17. The machine-readable storage according to claim 15, wherein said at least one code section comprises code for enabling feeding back an output of one of said multiple pipeline stages to an input of a previous one of said multiple pipeline stages.

18. The machine-readable storage according to claim 11, wherein said processed metadata information comprises a frame start indicator associated with said decoded PCM frame.

19. The machine-readable storage according to claim 18, wherein said at least one code section comprises code for tagging at least a portion of said decoded PCM frame with said frame start indicator.

20. The machine-readable storage according to claim 11, wherein said processed metadata information comprises a plurality of mixing coefficients.

21. A system for processing audio signals, the system comprising:
one or more circuits that enable processing metadata information generated from a decoded pulse code modulation (PCM) frame, wherein said decoded PCM frame comprises audio information; and
said one or more circuits enable asynchronously pipeline processing said audio information in said decoded PCM frame based on said processed metadata information and an output decoding rate, wherein input of data into each stage of said asynchronously pipeline processing is dynamically controlled by said output decoding rate.

22. The system according to claim 21, wherein said one or more circuits enable mixing of a primary audio information portion and a secondary audio information portion in said decoded PCM frame during said asynchronously pipeline processing.

23. The system according to claim 21, wherein said one or more circuits enable sample rate conversion of said audio information in said decoded PCM frame during said asynchronously pipeline processing.

24. The system according to claim 21, wherein said one or more circuits enable buffering of said audio information in said decoded PCM frame during said asynchronously pipeline processing.

25. The system according to claim 21, wherein said asynchronously pipeline processing comprises multiple pipeline stages.

26. The system according to claim 25, wherein said one or more circuits enable pulling of said audio information through each of said multiple pipeline stages based on said output decoding rate.

27. The system according to claim 25, wherein said one or more circuits enable feeding back of an output of one of said multiple pipeline stages to an input of a previous one of said multiple pipeline stages.

28. The system according to claim 21, wherein said processed metadata information comprises a frame start indicator associated with said decoded PCM frame.

29. The system according to claim 28, wherein said one or more circuits enable tagging of at least a portion of said decoded PCM frame with said frame start indicator.

30. The system according to claim 21, wherein said processed metadata information comprises a plurality of mixing coefficients.

* * * * *